Dec. 13, 1960
R. A. BROWN
2,964,074
SCRAG SAW MILL
Filed Sept. 4, 1959
3 Sheets-Sheet 1
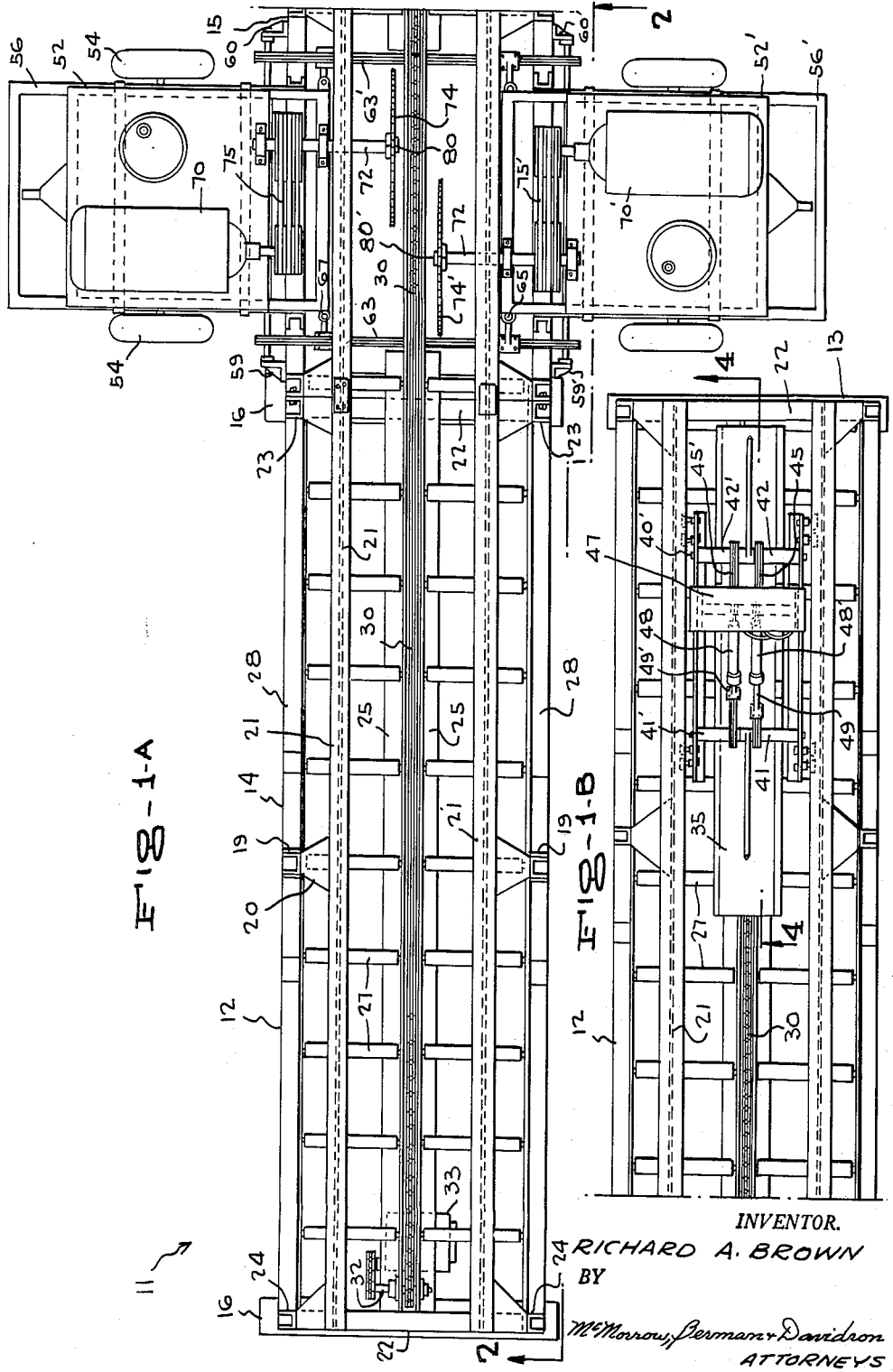
INVENTOR.
RICHARD A. BROWN
BY
McMorrow, Berman + Davidson
ATTORNEYS

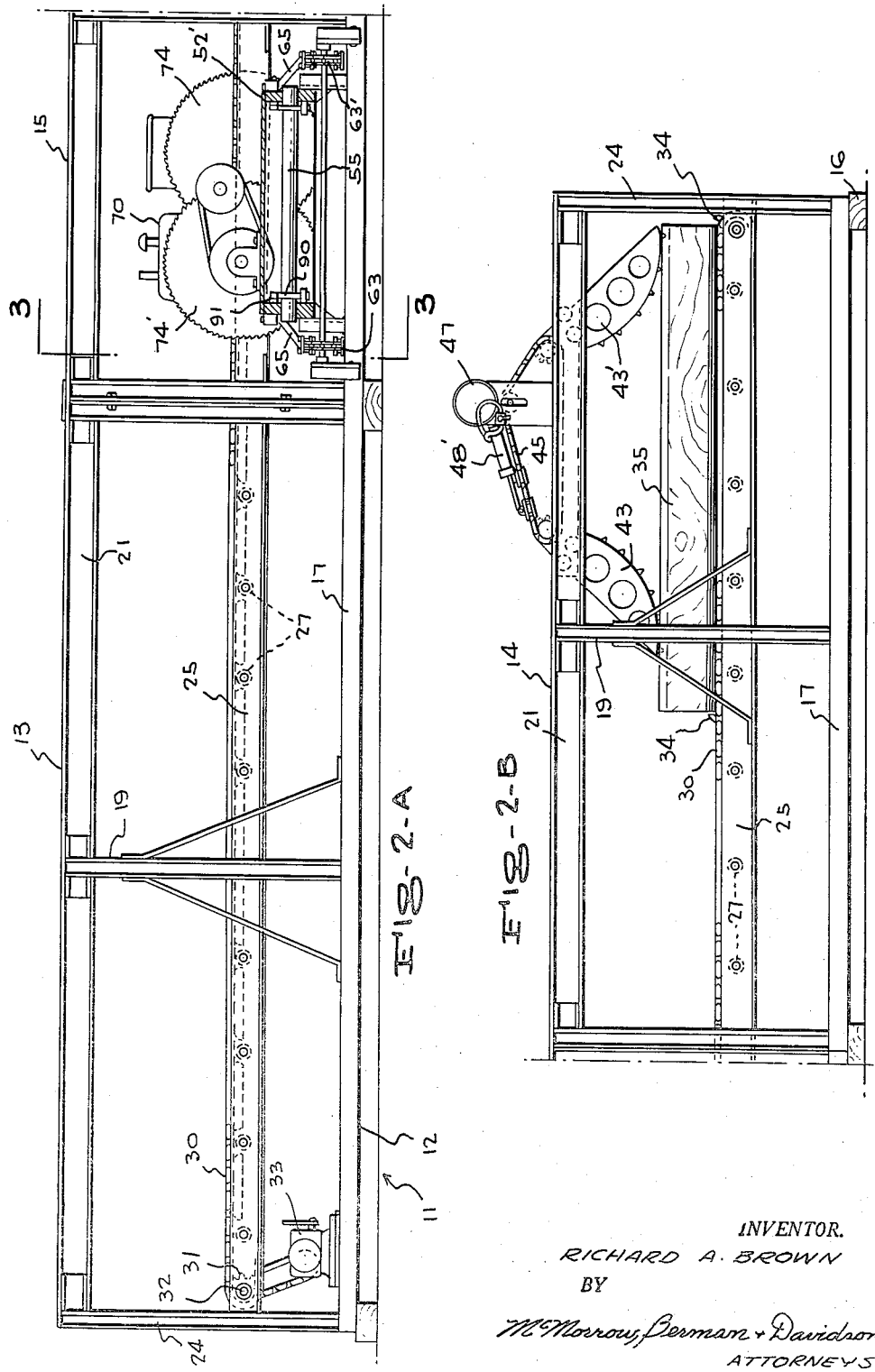

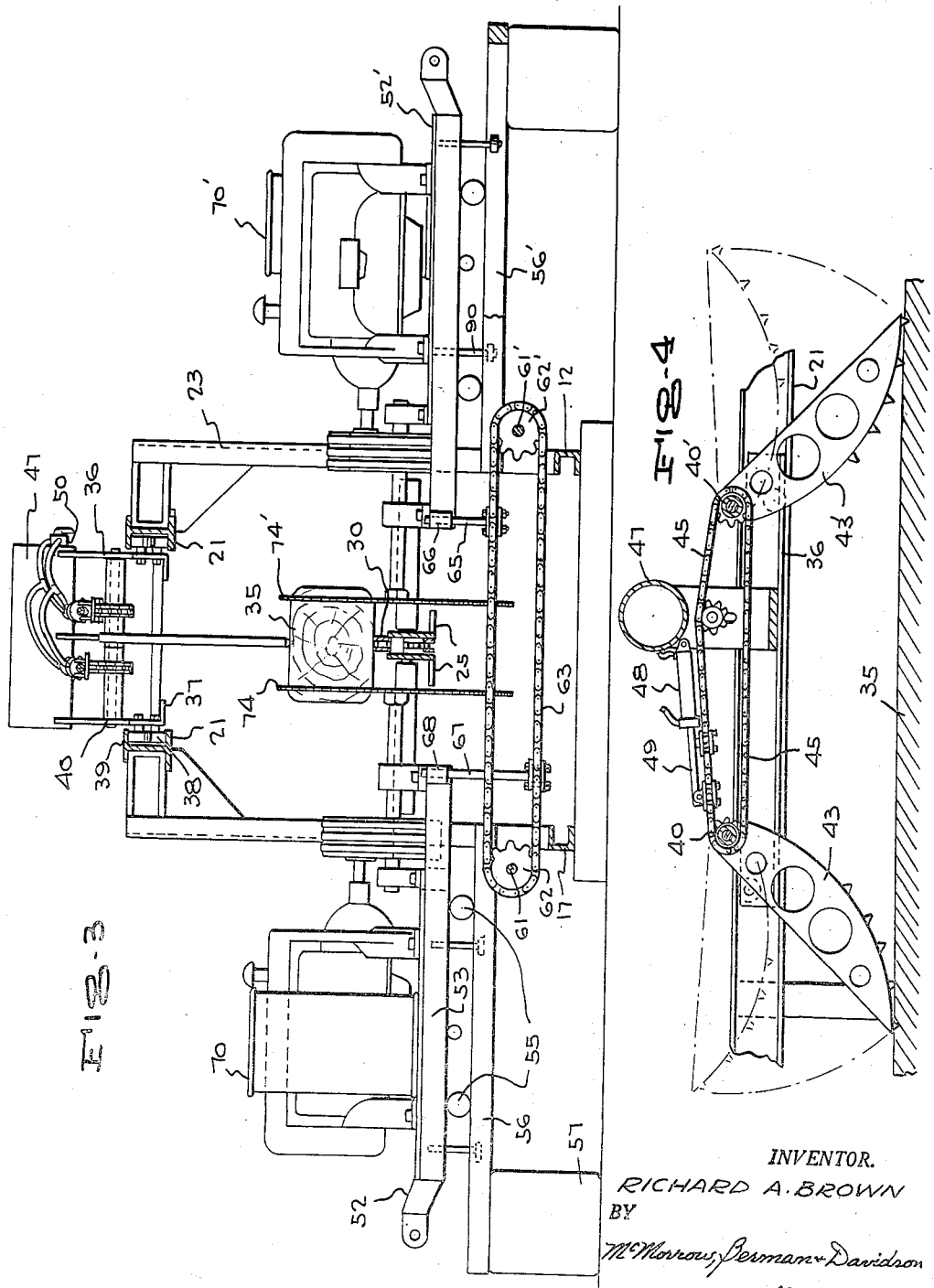

2,964,074
SCRAG SAW MILL

Richard A. Brown, P.O. Box 40, Mineral, Calif.

Filed Sept. 4, 1959, Ser. No. 838,339

7 Claims. (Cl. 143—49)

This invention relates to saw mills, and more particularly to a portable saw mill of the type in which a log is moved between two circular saws so that the log is cut into elongated boards.

A main object of the invention is to provide an improved portable saw mill of the type in which a log is moved past a pair of circular saw blades, the log being carried on a conveyor chain, the saw blades operating to cut the log into elongated boards, the apparatus being arranged so that the saw blades may be adjusted relative to each other and may be moved close enough to cut boards of standard thickness of the order of between one and two inches.

A further object of the invention is to provide an improved scrag saw mill which is provided with improved means for clamping a log to the conveyor chain associated with the saw mill and to securely hold the log on the conveyor chain so that it will be relatively rigidly held as it is moved between the circular saw blades associated with the mill, allowing the saw blades to cut through the log accurately and in a simultaneous fashion.

A still further object of the invention is to provide an improved scrag saw mill of the type wherein a log is moved simultaneously past a pair of spaced circular saw blades and wherein the saw blades may be adjusted to provide boards of standard thickness when a log is passed between the blades, the apparatus being relatively simple in construction, being easy to set up for use, and being easy to adjust.

A still further object of the invention is to provide an improved scrag saw mill which involves relatively inexpensive components, which comprises parts which are readily separable and which are independently movable, whereby the saw mill may be easily and expeditiously moved from one location to another, and wherein various components of the saw mill are provided with drive means which may be powered by portable prime movers which are relatively mobile and which can be moved with the other parts of the apparatus.

Further objects and advantages of the invention will become apparent from the following description and claims, and from the accompanying drawings, wherein:

Figures 1a and 1b are plan views of segments forming an improved scrag saw mill constructed in accordance with the present invention.

Figure 2a is a vertical cross sectional view taken on the line 2—2 of Figure 1a.

Figure 2b is a side elevational view of the segment of the apparatus shown in Figure 1b.

Figure 3 is an enlarged transverse vertical cross sectional view taken on the line 3—3 of Figure 2a.

Figure 4 is an enlarged vertical cross sectional view taken on the line 4—4 of Figure 1b.

Referring to the drawings, 11 generally designates an improved scrag saw mill according to the present invention. The saw mill 11 comprises an elongated horizontal frame 12 consisting of a pair of end sections 13 and 14 and an intermediate section 15 bolted together to define a single elongated frame, the frame being supported on transversely extending supporting beams 16. The frame sections comprise longitudinal channel bars 17, 17 which are fastened together at the outer ends of the main sections 13 and 14 by cross bars 22. The frame 12 includes spaced upstanding vertical channel bars 19 secured on the horizontal channel bars 17 and provided at their top ends with inwardly projecting horizontal bracket members 20. Secured to the bracket members 20 are longitudinal I-beams 21, said I-beams being located in parallel relationship and being disposed inwardly of the base channel bars 17, whereby to define an elevated track extending substantially for the full length of the frame 12.

The main sections 13 and 14 of the frame 12 are provided with the cross bars 22 secured transversely to upstanding post members 24, 24 and 23, 23 welded on the ends of the bottom longitudinal channel bars 17, 17 associated with said main sections. Respective pairs of angle bars 25, 25 are secured longitudinally to the intermediate portions of the cross bars 22, 22 on each of the sections 13 and 14, the vertical flanges of the angle bars being in spaced parallel relation to each other and being parallel to and spaced midway between the elevated track means defined by the I-beams 21, 21, as is clearly shown in Figure 3. Transverse rollers 27 are journaled between the vertical flanges of the angle bars 25, 25 and the vertical flanges of the outer angle bars 28, 28 secured to the vertical post members 19 and 24 and located above the base channel bars 17 and at the same level as the angle bars 25, 25.

A chain conveyor 30 is provided between the vertical flanges of the angle bars 25, 25, said chain conveyor being mounted on suitable sprockets journaled between the vertical flanges of the angle bars 25, 25 and being driven by an end sprocket 31 mounted on a conveyor drive shaft 32 journaled between the vertical flanges of the angle bars 25, 25 at the outer end of the frame section 13. Shaft 32 is driven by an internal combustion engine 33 mounted on frame section 13 below the shaft 32, as shown in Figure 2a. The chain conveyor 30 is provided with upstanding lugs 34, spaced to receive a log 35 therebetween, as shown in Figure 2b.

Designated generally at 36 is a carriage which comprises a rectangular frame 37 provided with outwardly projecting pairs of rollers 38, 39 at its respective corners, said rollers being adapted to respectively engage the upper and lower inside flanges of the track-defining I-beams 21, 21, as shown in Figure 3. Respective transverse bearing shafts 40 and 40' are provided adjacent the opposite end portions of the rectangular carriage frame 37. Respective sleeves 41 and 41' are rotatably mounted on the transverse bearing shaft 40 and respective sleeves 42 and 42' are rotatably mounted on the transverse bearing shaft 40'. As shown in Figure 1B, the sleeve 41 is substantially longer than the sleeve 41' and the sleeve 42' is substantially longer than the sleeve 42, the sleeve 42 being arranged diagonally opposite the sleeve 41' and the sleeve 41 being arranged diagonally opposite the sleeve 42'. Respective log-clamping dogs 43 and 43' are rigidly secured to the inner end portions of the sleeves 41 and 42', said log-clamping dogs being substantially located in the same longitudinal vertical plane and being in the same longitudinal vertical plane as the chain conveyor 30. Thus, the dogs 43 and 43' are adapted to clampingly engage on the top surface of a log 35 carried on the chain conveyor 30 in the manner illustrated in Figures 2B and 4.

A first sprocket chain 45 is engaged on respective sprockets secured on the sleeves 41 and 42 and a second sprocket chain 45' is engaged on respective sprockets secured on the sleeves 41′ and 42′. An air pressure reservoir 47 is transversely secured on the carriage frame 37 above the shafts 40, 40′, as shown in Figure 4, air under pressure being furnished to the reservoir 47 from a portable external compressor. Respective fluid pressure cylinders 48 and 48′ are pivoted to the reservoir 47, said cylinders being provided with the respective externally projecting piston rods 49′ and 49. The piston rods 49′ and 49 are respectively connected to the sprocket chains 45 and 45′, so that the simultaneous extension of the piston rod 49 and retraction of piston rod 49′ urges the clamping dogs 43 and 43′ downwardly into clamping engagement with a log 35, whereas the simultaneous retraction of the piston rod 49 and the extension of piston rod 49′ moves the sprocket chains 45 and 45′ in directions to elevate the clamping dogs 43 and 43′. Thus, simultaneous extension of the rod 49 and retraction of rod 49′ moves the sprocket chains 45 and 45′ in opposite directions, namely the directions required to rotate the dogs 43 and 43′ downwardly, whereas simultaneous retraction of piston rod 49 and extension of rod 49′ moves the sprocket chains 45 and 45′ in their reverse directions, oppositely to each other, to raise the clamping dogs. The fluid pressure cylinders 48 and 48′ are connected to the tank 47 through a suitable two-way valve 50 so that the valve may be operated in a conventional manner to reversibly admit air under pressure simultaneously to opposite ends of the cylinders 48 and 48′ so as to accordingly control the movement of the associated piston rods 49 and 49′.

The tank 47 may be charged from a suitable portable air compressor, as above mentioned, and may be filled with air under pressure to a sufficient volume to operate the cylinders 48 and 48′. Alternatively, the tank 47 may be connected to the external compressor by a sufficient length of flexible hose to allow the carriage 36 to move for substantially the entire length of the frame 12.

Designated respectively at 52 and 52′ are transversely extending supports comprising suitable trailer frames 53 provided with supporting wheels 54, 54, whereby the supports 52, 52′ are readily transportable. The supports 52, 52′ are movably supported on rollers 55 disposed on transversely extending rectangular frames 56, 56′ horizontally mounted and extending from the respective opposite sides of the intermediate frame section 15, the outer ends of the frames 56 and 56′ being supported on suitable blocks 57. Journaled on respective pairs of brackets 59, 60 and 59′, 60′ secured to the opposite sides of the intermediate section 15 of frame 12 are respective shafts 61, 61′ on which are secured respective pairs of sprockets 62, 62′ coupled together by sprocket chains 63, 63′. The top runs of the sprocket chains are connected to the inner corner portions of the movable support 52′ and the bottom runs of the chains are connected to the inner corner portions of the movable support 52. Thus, vertical connecting pins 65 are secured to the top runs of the sprocket chains 63, 63′ and engage through apertured lugs 66 provided at the inner corners of the support 52′. Similarly, upstanding vertical connecting pins 67 are connected to the lower runs of the sprocket chains 63 and 63′ and extend through apertured corner lugs 68 provided on the support 52.

As will be readily apparent, movement of the sprocket chains 63, 63′ in one direction, namely, in a counterclockwise direction, as viewed in Figure 3, moves the supports 52 and 52′ inwardly towards each other, whereas reverse movement of the sprocket chains moves the supports outwardly.

Respective power units, for example, diesel engines 70 and 70′ are mounted on the supports 52, 52′, the power units being offset in the manner illustrated in Figure 1a. Designated at 72 and 72′ are respective transversely extending circular saw shafts which are journaled on the respective supports 52 and 52′ in offset relation, namely, at locations spaced longitudinally along the conveyor chain 30, as is clearly shown in Figure 1a. Secured on the inner ends of the shafts 72 and 72′ are the respective circular saw blades 74 and 74′. The shafts 72 and 72′ are drivingly coupled to the output shafts of the power units 70 and 70′ by suitable belts 75, 75′ engaging on drive pulleys provided respectively on the output of the power units and the shafts 72 and 72′, as is clearly shown in Figure 1a.

Respective saw blades 74 and 74′ are thus mounted parallel to each other on opposite sides of and parallel to the chain conveyor 30 and offset longitudinally relative to said chain conveyor. Any suitable means may be provided for adjusting the supports 52 and 52′, namely, for rotating the sprocket shafts 61, 61′, whereby to adjust the spacing between the saw blades 74 and 74′ to a desired value, for example, a value corresponding to the standard thickness of boards to be sawed from the log 35. Thus, as the log 35 is successively passed through the saw mill, the distance between the saw blades 74, 74′ may be progressively decreased, to decrease the distance by standard amounts as the boards are removed from the log, until finally the distance between the blades will be equal to that corresponding to a standard thickness of board.

In operation, the log 35 is clamped on the conveyor chain 30, securing the log as it is passed through the mill and engaged against the rotating saw blades 74, 74′.

Due to the offset relationship of the circular saw shafts 72 and 72′, the blades may be relatively adjustable with respect to each other so that they may be set to a distance apart corresponding to the thickness of a standard board rather than by being limited in their inward adjustment by the possibility of abutment of their end collars 80, 80′, as would be the case if the shafts 72, 72′ were coaxially arranged.

As will be readily apparent, the log 35 is first clamped on the conveyor chain 30 by means of the clamping dogs 43, 43′, said dogs being urged downwardly by their associated fluid pressure cylinders 48, 48′, as above described. The log may then be moved by means of the conveyor chain 30 past the saw blades, the carriage 36 moving with the log along the track means defined by the opposing I-beams 21, 21. The log 35 may thus be successively passed through the blades, the blades being adjusted inwardly after each pass, until finally the last cut leaves a board of standard thickness.

As shown in Figures 2a and 3, upstanding stop pins 90 are provided on the members 56 and 56′, said stop pins being rigidly secured to the members 56 and 56′ and projecting upwardly into the bottoms of the movable supports 52 and 52′ and being engageable with stop lugs 91 provided within the movable supports 52 and 52′ to limit the transverse movement of said movable supports.

While a specific embodiment of an improved scrag saw mill has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a saw mill, elevated horizontal track means, a carriage movably mounted on said track means, a pivoted dog on said carriage, a chain conveyor mounted below and parallel to said track means and in the same vertical plane as said dog, said dog being swingable in a vertical plane parallel to the track means and being forcibly engageable with a log carried by the chain conveyor, a pair of transverse supports disposed in opposing relation on opposite sides of said chain conveyor, respective transverse saw shafts journaled on said supports, drive means connected to said shafts, respective circular saws mounted on said shafts, said shafts being offset longitudinally with respect to said chain conveyor, and means to adjust the spacing between said circular saws.

2. In a saw mill, elevated horizontal track means, a carriage movably mounted on said track means, a pivoted dog on said carriage, a chain conveyor mounted below and parallel to said track means and in the same vertical plane as said dog, said dog being swingable in a vertical plane parallel to the track means and being forcibly engageable with a log carried by the chain conveyor, a pair of transversely movable supports disposed in opposing relation on opposite sides of said chain conveyor, respective transverse saw shafts journaled on said supports, drive means on said supports connected to said shafts, respective circular saws mounted on said shafts, said shafts being offset longitudinally with respect to said chain conveyor, and means to simultaneously move the supports relative to each other, whereby to adjust the spacing between said circular saws.

3. In a saw mill, elevated horizontal track means, a carriage movably mounted on said track means, a chain conveyor mounted below and parallel to said track means, a pair of opposing dogs pivoted to said carriage in a common longitudinal vertical plane, said plane containing said chain conveyor, said dogs being each swingable in a vertical plane parallel to the track means and being forcibly engageable with a log carried by the chain conveyor, means to simultaneously urge the dogs downwardly, whereby to clampingly engage a log carried on said chain conveyor, a pair of transverse supports disposed in opposing relation on opposite sides of said chain conveyor, respective transverse saw shafts journaled on said supports, drive means connected to said shafts, respective circular saws mounted on said shafts, said shafts being offset longitudinally with respect to said chain conveyor, and means to adjust the spacing between said circular saws.

4. In a saw mill, elevated horizontal track means, a carriage movably mounted on said track means, a chain conveyor mounted below and parallel to said track means, a pair of opposing dogs pivoted to said carriage in a common longitudinal vertical plane, said plane containing said chain conveyor, said dogs being each swingable in a vertical plane parallel to the track means and being forcibly engageable with a log carried by the chain conveyor, a pair of transversely movable supports disposed in opposing relation on opposite sides of said chain conveyor, respective transverse saw shafts journaled on said supports, drive means on said supports connected to said shafts, respective circular saws mounted on said shafts, said shafts being offet longitudinally with respect to said chain conveyor, and means to simultaneously move the supports relative to each other, whereby to adjust the spacing between said circular saws.

5. In a saw mill, elevated horizontal track means, a carriage movably mounted on said track means, a chain conveyor mounted below and parallel to said track means, a pair of opposing dogs pivoted to said carriage in a common longitudinal vertical plane, said plane containing said chain conveyor, said dogs being each swingable in a vertical plane parallel to the track means and being forcibly engageable with a log carried by the chain conveyor, means to simultaneously urge the dogs downwardly, whereby to clampingly engage a log carried on said chain conveyor, a pair of transversely movable supports disposed in opposing relation on opposite sides of said chain conveyor, respective transverse saw shafts journaled on said supports, drive means on said supports connected to said shafts, respective circular saws mounted on said shafts, said shafts being offset longitudinally with respect to said chain conveyor, a transversely extending vertical endless belt member mounted adjacent said supports, means connecting one of the supports to the upper run of said belt member, and means connecting the other support to the lower run of the belt member, whereby said supports are moved relative to each other responsive to movement of said belt member, whereby to adjust the spacing between said circular saws.

6. In a saw mill, an elongated horizontal frame including a plurality of transverse rollers, longitudinally extending elevated horizontal track means on said frame, a carriage movably mounted on said track means, a longitudinally extending chain conveyor mounted on said frame below and parallel to said track means, a plurality of downwardly movable dogs pivoted to said carriage in the same vertical longitudinal plane as said conveyor, said dogs being each swingable in a vertical plane parallel to the track means and being forcibly engageable with a log carried by the chain conveyor, means to simultaneously urge said dogs downwardly, whereby to clampingly engage a log carried on said chain conveyor, a pair of transversely movable supports disposed on opposite sides of said frame, respective transverse saw shafts journaled on said supports in longitudinally offset relation to each other relative to said chain conveyor, respective circular saws mounted on the inner ends of said shafts, and means to move one of the supports relative to the other support, whereby to adjust the spacing between the circular saws.

7. In a saw mill, an elongated horizontal frame including a plurality of transverse rollers, longitudinally extending elevated horizontal track means on said frame, a carriage movably mounted on said track means, a longitudinally extending chain conveyor mounted on said frame below and parallel to said track means, a plurality of downwardly movable dogs pivoted to said carriage in the same vertical longitudinal plane as said conveyor, said dogs being each swingable in a vertical plane parallel to the track means and being forcibly engageable with a log carried by the chain conveyor, means to simultaneously urge said dogs downwardly, whereby to clampingly engage a log carried on said chain conveyor, a pair of transversely movable supports disposed on opposite sides of said frame, respective transverse saw shafts journaled on said supports in longitudinally offset relation to each other relative to said chain conveyor, respective circular saws mounted on the inner ends of said shafts, and means to simultaneously move the supports in opposite directions transverse to the frame, whereby to adjust the spacing between the circular saws.

References Cited in the file of this patent

UNITED STATES PATENTS

| | | |
|---|---|---|
| 518,031 | Garland | Apr. 10, 1894 |
| 584,789 | Olson | June 22, 1897 |
| 675,115 | Smith | May 28, 1901 |
| 1,332,477 | Sturm | Mar. 2, 1920 |
| 2,349,133 | Benton | May 6, 1944 |
| 2,641,288 | Blickenderfer et al. | June 9, 1953 |